United States Patent [19]
Kuroda

[11] 4,086,822
[45] May 2, 1978

[54] AUTOMOTIVE TRANSMISSION SHIFTING MECHANISM

[75] Inventor: Akitada Kuroda, Toyota, Japan

[73] Assignee: Toyota Jidosha Kogyo Kabushiki Kaisha, Toyota, Japan

[21] Appl. No.: 753,019

[22] Filed: Dec. 21, 1976

[30] Foreign Application Priority Data

Dec. 28, 1975  Japan .................. 50-158399

[51] Int. Cl.² ........................... G05G 7/16
[52] U.S. Cl. ..................... 74/473 R; 74/491
[58] Field of Search ......... 74/473 R, 491, 523; 251/231

[56] References Cited

U.S. PATENT DOCUMENTS

| 1,653,369 | 12/1927 | Murphy | 251/231 |
|---|---|---|---|
| 3,693,474 | 9/1972 | Trick | 74/491 X |
| 3,899,934 | 8/1975 | Froumajou | 74/473 X |

FOREIGN PATENT DOCUMENTS 1,402,662  8/1975  United Kingdom.

*Primary Examiner*—Allan D. Herrmann
*Attorney, Agent, or Firm*—Cushman, Darby & Cushman

[57] ABSTRACT

An automotive transmission shifting mechanism wherein a gearshift lever whose lower end is connected through a control rod to a control shaft of a transmission pivots about a ball fulcrum mounted on links each of which in turn is supported on the floor for pivotal movement in a vertical plane in parallel with the longitudinal axis of an automotive car, the lower end of the link being pivoted to one end of a support rod which is extended substantially parallel with and upwardly of the control rod and whose the other end is pivoted to a transmission housing, whereby upon displacement of the transmission relative to the car body, the link may be permitted to be swinged relative to the floor and consequently no vibration of the transmission may be transmitted to the knob at the upper end of the shift lever.

5 Claims, 5 Drawing Figures

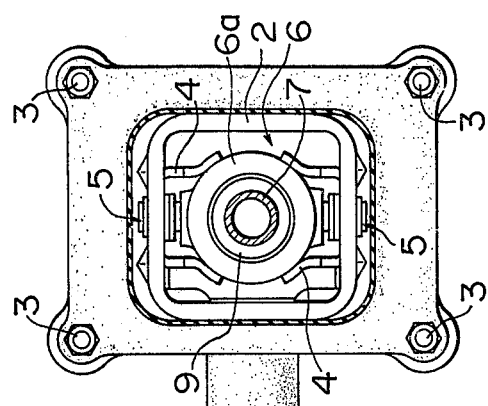
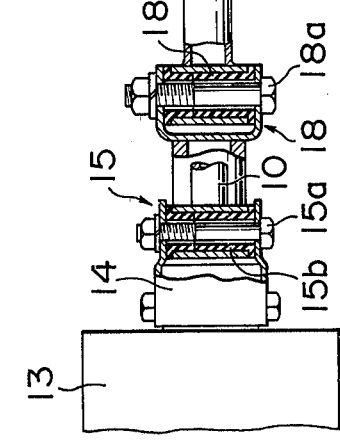
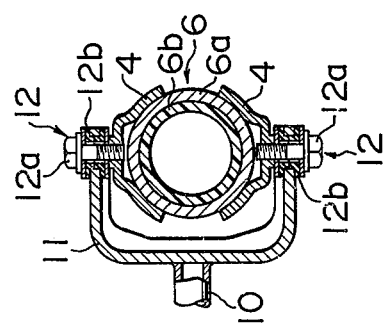
FIG. 3
FIG. 4

AUTOMOTIVE TRANSMISSION SHIFTING MECHANISM

The present invention relates to a shifting mechanism for an automotive transmission of the type wherein the lower end of a shift lever is operatively connected through a control rod to a control shaft of the transmission, whereby gear shift may be accomplished by shifting and selecting of the shift lever.

In general, an automotive engine with a transmission is subjected to the up-and-down, back-and-forth and rotating vibrations relative to an automotive body due to the vibration of the engine itself and the acceleration and deceleration, and the vibration of the transmission in turn is transmitted with or without amplification to the shift lever through the control rod so that the vibration or chattering of the shift lever gives unpleasant feeling to a driver. When the driver tries for forcibly damper or prevent the chattering of the shift lever, the disengagement of shift gears occurs.

In view of the above, one of the objects of the present invention is to provide an automotive transmission shifting mechanism which may substantially isolate a shifting lever from the vibration of an engine with a transmission.

To this end, briefly stated the present invention provides an automotive transmission shifting mechanism wherein a link has its upper end pivoted with a fulcrum means to a bracket anchored to the floor of an automotive body and the other end pivoted with a fulcrum means to one end of a support rod whose the other end is pivoted with a fulcrum means to a transmission housing, and a control rod has its one end pivoted with a fulcrum means to the lower end of a gearshift lever which in turn is pivoted with a ball fulcrum to the link, the control rod being extended downwardly of and substantially in parallel with the support rod in a vertical plane including the axis of the latter and having its the other end pivoted with a fulcrum means such as a pin joint to a control shaft of the transmission.

According to one preferred embodiment of the present invention, in the shifting mechanism with the above construction the following relation is held:

$$L_1/L_2 = l_1/l_2$$

where $L_1$ = a distance between the center of a knob attached to the upper end of the shift lever and a fulcrum point between the shift lever and the control rod, $L_2$ = a distance between the center of the knob and a fulcrum point of the ball fulcrum between the link and the shift lever, $l_1$ = a distance between a fulcrum point of the fulcrum means between the upper end of the link and the bracket and a fulcrum point of the fulcrum means between the lower end of the link and the support rod, and $l_2$ = a distance between the fulcrum point of the upper end of the link and the fulcrum point of the ball fulcrum.

The above and other objects, features and advantages of the present invention will become more apparent from the following description of a preferred embodiment thereof taken in conjunction with the accompanying drawings.

FIG. 3 is a sectional view taken along the line III—III of FIG. 1;

FIG. 4 is a sectional view taken along the line IV—IV of FIG. 1; and

Figure 1:
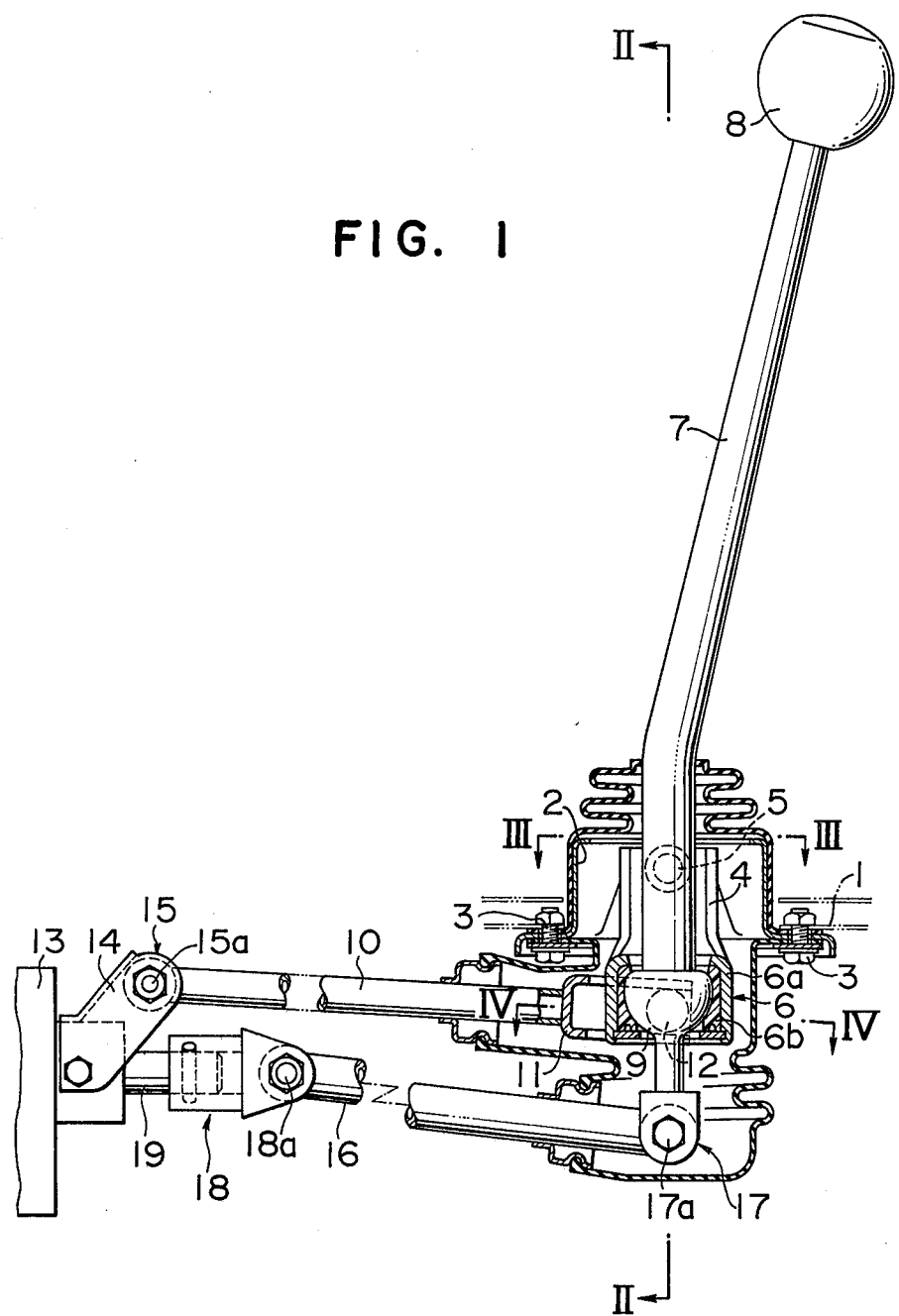
FIG. 1 is a front view, partly in section, of a preferred embodiment of a shifting mechanism in accordance with the present invention.
Figure 2:
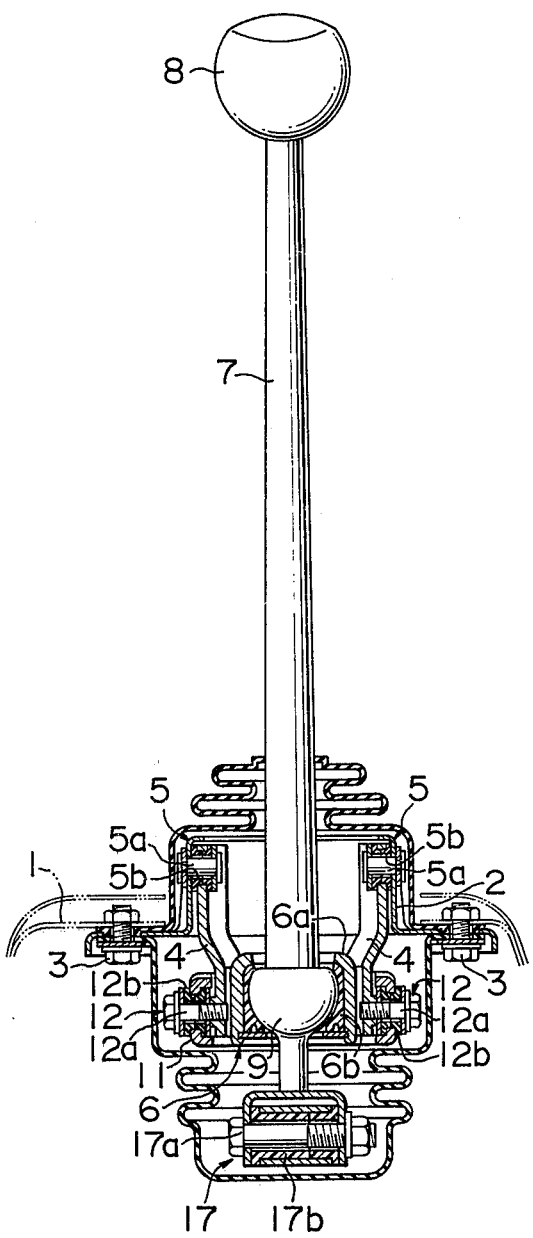
FIG. 2 is a sectional view taken along the line II—II of FIG. 1.

Referring to FIGS. 1 through 4, a box-shaped bracket 2 with open top and bottom is securely anchored to a floor 1 of an automotive body with bolts and nuts 3, and inside the bracket 2 upper ends of a pair of links 4 are supported with fulcrums 5 each consisting of a pin 5a extended laterally. Pivoted between the links 4 with a ball-joint fulcrum 6 is a shift lever 7 with a shift lever knob 8 attached to the upper end thereof in such a way that the knob 8 may be moved not only in the shift operating direction; that is, in the longitudinal direction of an automotive car (to the right and left in FIG. 1) but also in the select operating direction; that is, the direction perpendicular to the longitudinal direction (to the right and left in FIG. 2). More specifically, formed between the links 4 integrally therewith is a shift lever housing 6a which pivotably receives a spherical projection 9 of the shift lever 7 with a spherical bush 6b interposed therebetween as best shown in FIG. 4. A yoke 11 at one end of a support rod 10 is pivoted outwardly to the lower ends of the links 4 with fulcrums 12 each consisting of a bolt 12a, whereas the other end of the support rod 10 is pivoted to a bracket 14 extended from a transmission housing 13 with a fulcrum 15 consisting of a bolt 15a.

One end (the right end in FIG. 1) of a control rod 16 is pivoted to the lower end of the shift lever 7 with a fulcrum 17 consisting of a bolt 17a, whereas the other end (the left end in FIG. 1) is pivoted with a pin-joint fulcrum 18 to a transmission control shaft 19 extended out of the transmission housing 13. As best shown in FIGS. 1 and 3, the control rod 16 is extended downwardly of the support rod 10 in a vertical plane including the axis of the support rod 10 and in parallel therewith.

As the shift lever 7 is pivoted about the ball-joint fulcrum 6 in the shift and select operating directions, the control rod 16 causes the control shaft 19 of the transmission to displace itself back and forth (to shift) and rotate about its axis (to select).

In order that a driver may have better feeling in shifting and selecting, the spherical bush 6b of the ball-joint fulcrum 6 as well as a bush 17b (See FIG. 2) of the fulcrum 17 between the shift lever 7 and the control rod 16 are preferably made of a relatively hard and smooth material such as nylon. Bushings 5b, 12b, 15b and 18b of the fulcrums 5, 12, 15 and 18 are not directly associated with the shifting and selecting and therefore they may be preferably of antivibration type made of rubber in order to damp the high-frequency vibration and noise transmitted from the transmission to the shifting mechanism. Especially the bushing 18b of the pin-joint fulcrum 18 between the control rod 16 and the control shaft 19 must be made of a material having a considerably high elasticity. The reason is that when the shift knob 8 is selected or moved to the right or left in FIG. 2, the control rod 16 is caused to swing because in the present embodiment the center of pivotal movement of the shift lever 7 about the ball-joint fulcrum 6 does not coincide with the axis of rotation of the control rod 16 so that the swinging movement of the latter must be absorbed by the elastic deformation of the bush 18b. Because of the same reason described above, the pin-joint 18 may be replaced with a hook joint.

Figure 5:
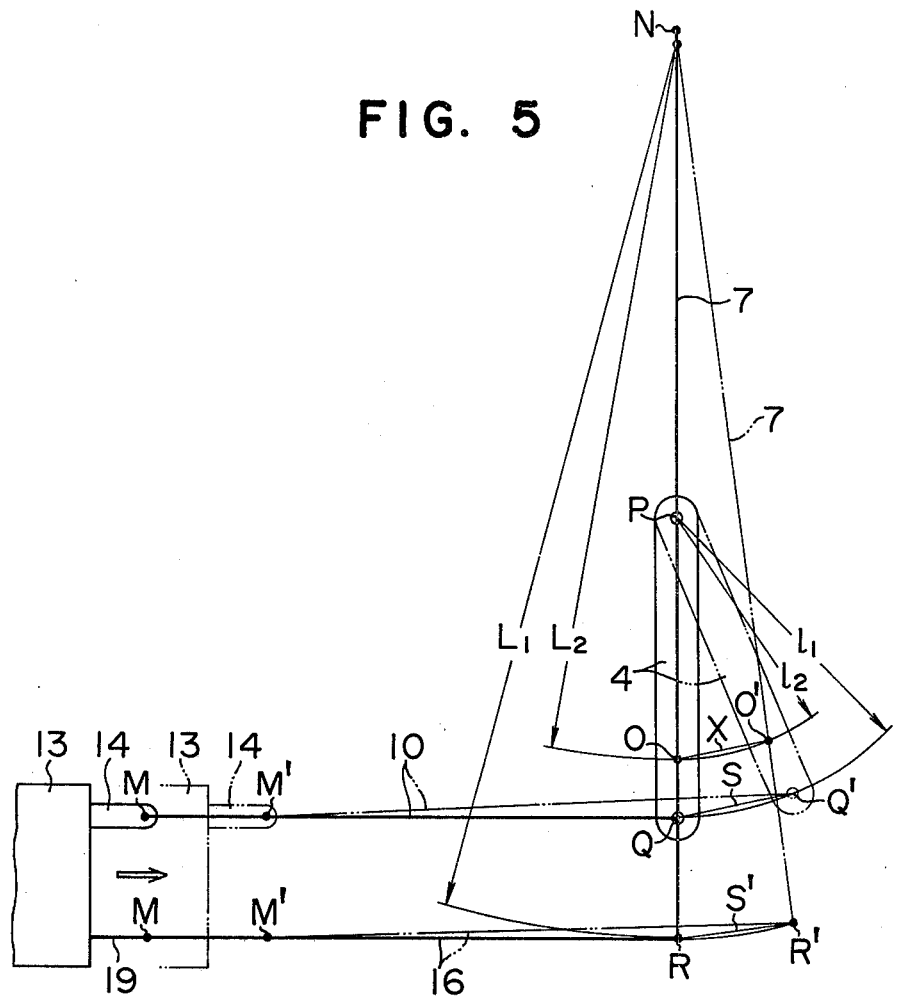
FIG. 5 is a view used for the explanation of the displacement of the shifting mechanism in response to the displacement of a transmission.

Next the influence on the shift lever 7 of the displacement of the engine with a transmission relative to the floor 1 caused by the vibration thereof will be described with particular reference to FIG. 5, wherein P = a fulcrum point of the links 4 which pivot about the fulcrums 5 relative to the bracket 2,
O = a fulcrum point of the ball fulcrum 6,
Q = a fulcrum point of the fulcrums 12 between the links 4 and the support rod 10,
R = a fulcrum point of the fulcrum 17 between the lower end of the shift lever 7 and the control rod 16,
N = a center of the shift lever knob 8,
M = fulcrum points of the fulcrum 15 between the support rod 10 and the transmission housing 13 and of the pin-joint fulcrum 18 between the control rod 16 and the control shaft 19,
$L_1$ = NR,
$L_2$ = NO
$l_1$ = PQ
$l_2$ = PO, and
$L_1/L_2 = l_1/l_2$.

Assume that due to the vibration the transmission housing 13 is displaced backwardly so that the fulcrum points M are also displaced to points M'. Then the link 4 is caused to swing about the fulcrum point P to a position indicated by the imaginary lines so that the fulcrum points O and Q are displaced to points O' and Q', respectively, by a distance X and a distance S, respectively. Under these conditions, the following relation is held:

$$X = S \cdot l_2/l_1 \qquad (I)$$

The fulcrum point R is also displaced to a point R' by a distance S'. Then under the assumption that no displacement of the point N occur, the following relation is held:

$$X = S' \cdot L_2/L_1 \qquad (II)$$

Since the displacement S' is almost equal to the displacement S and from Eqs. (I) and (II), the above relation $L_1/L_2 = l_1/l_2$ must be satisfied.

In other words, the distances $L_1$, $L_2$, $l_1$ and $l_2$ are selected to satisfy the above relation in the present invention so that the displacement of the knob 8 of the shift lever 7 remains substantially zero regardless of the displacement of the transmission housing 13. In addition, because of the antivibration effects of the bushings 5b, 12b, 15b and 18b of the fulcrums 5, 12 and 15 and the pin-joint fulcrum 18, the up-and-down and rotating vibrations of the transmission housing 13 will hardly cause any displacement of the knob 8.

As described above, according to the present invention the shift lever knob is substantially isolated from the vibration of the engine with a transmission so that the vibration or chattering of the knob may be considerably eliminated, better gear shift operation feeling may be ensured and the disengagement of the shift gears may be prevented.

What is claimed is:

1. An automotive transmission shifting mechanism comprising
    (a) a shift lever with a knob attached to the upper end thereof,
    (b) a bracket securely anchored to a floor of an automotive body,
    (c) at least one link having its upper end pivoted to said bracket for pivotal movement in the longitudinal direction of the body,
    (d) fulcrum means of said shift lever mounted on said link at a position between the upper and lower ends of said link for permitting the pivotal movement of said shift lever in the longitudinal and lateral directions,
    (e) a support rod having its one end pivoted to the lower end of said link and the other end pivoted to a transmission housing, and
    (f) a control rod extended downwardly of and substantially in parallel with said support rod and having its one end pivoted to the lower end of said shift lever and the other end pivoted to a control shaft of said transmission, whereby the movement of said shift lever may be transmitted to said control shaft.

2. An automotive transmission shifting mechanism as set forth in claim 1, wherein the following relation is held:

$$L_1/L_2 = l_1/l_2$$

wherein $L_1$ = a distance between the center of said knob of said shift lever and the pivotal point at the lower end of said shift lever about which said control rod pivots,
$L_2$ = a distance between the center of said knob of said shift lever and the fulcrum point thereof,
$l_1$ = a distance between the upper pivotal point of said link and the lower pivotal point thereof about which said support rod pivots, and
$l_2$ = a distance between said upper pivotal point of said link and said fulcrum point of said shift lever.

3. An automotive transmission shifting mechanism as set forth in claim 1, wherein
    said fulcrum means for said shift lever consists of
    a housing interposed between a pair of said links and securely attached thereto, and
    a spherical bushing supported in said housing for receiving therein a spherical projection formed integral with said shift lever; and
    one end of said support rod opposite to the end pivoted to said transmission housing is terminated into a yoke having its legs pivoted to said pair of links, respectively.

4. An automotive transmission shifting mechanism as set forth in claim 3, wherein
    said links, said support rod and said control rod are all pivoted with a pin and a cylindrical bushing for receiving said pin,
    said spherical bushing and the bushing of the fulcrum between said control rod and the lower end of said shift lever are made of a relatively smooth material,
    the bushings of the fulcrums between said links and said support rod, and between said support rod and the transmission housing are made of a resilient material capable of absorbing or damping high-frequency vibration; and the bushing of the fulcrum between said control rod and said control shaft is made of a resilient material having a considerably higher elasticity.

5. An automotive transmission shifting mechanism as set forth in claim 4, wherein said spherical bushing and the bushing of the fulcrum between said control rod and the lever end of said shift lever are made of nylon, and the bushings of the fulcrums between said links and said support rod, between said support rod and the transmission housing and between said control rod and said control shaft are made of rubber.

* * * * *